United States Patent [19]
Pollock et al.

[11] Patent Number: 5,443,894
[45] Date of Patent: Aug. 22, 1995

[54] FIRE RETARDANT ORIENTED STRAND BOARD STRUCTURE ELEMENT

[75] Inventors: Mark W. Pollock, Avon; John J. Wetula, Richmond Heights, both of Ohio; Brian M. Ford, Grayslake, Ill.

[73] Assignee: Ucar Carbon Technology Corporation, Danbury, Conn.

[21] Appl. No.: 282,908

[22] Filed: Jul. 29, 1994

[51] Int. Cl.$^6$ ............................................. B32B 5/02
[52] U.S. Cl. ................................. 428/213; 428/106; 428/107; 428/535; 428/921; 52/729.4
[58] Field of Search ................. 428/68, 76, 920, 921, 428/105–113, 213, 535; 52/727, 729

[56] References Cited

U.S. PATENT DOCUMENTS

| | | | |
|---|---|---|---|
| 3,956,555 | 5/1976 | McKean | 428/106 |
| 4,209,561 | 6/1980 | Sawko | 428/114 |
| 4,666,029 | 5/1987 | Burkner | 198/382 |
| 4,715,162 | 12/1987 | Brightwell | 52/729 |
| 5,176,863 | 1/1993 | Howard | 264/113 |
| 5,187,000 | 2/1993 | Chow et al. | 428/141 |
| 5,217,665 | 6/1993 | Lim et al. | 264/83 |

FOREIGN PATENT DOCUMENTS 61-198614387  1/1986  Japan .

OTHER PUBLICATIONS

International Appln. No. PCT/EP91/00209 Aug. 8, 1991 to Malkit, Singh, "Intumescent Fire Protection Compositions".
Technical Bulletin Issued Nov. 1993, "Oriented Strandboard and Waferboard".
Panel World Issued Nov. 1993, "OSB Industry Increases Capacity, Gears Up For Years of Fast Growth", p. 12.

*Primary Examiner*—Alexander S. Thomas
*Attorney, Agent, or Firm*—F. J. McCarthy

[57] ABSTRACT

This invention relates to a fire retardant wooden structural element, such as the web of a wooden joist, a wall panel, exterior or interior siding panel or the like, which is formed of oriented strand board (OSB) having outer layers which contain particles of expandable graphite and a core layer which is free of expandable graphite.

4 Claims, 2 Drawing Sheets

FIRE RETARDANT ORIENTED STRAND BOARD STRUCTURE ELEMENT

FIELD OF THE INVENTION

This invention relates to a fire retardant wooden structural element, such as the web of a wooden joist, a wall panel, exterior or interior siding panel or the like, which is formed of oriented strand board (OSB) having outer layers which contain particles of expandable graphite and a core layer which is free of expandable graphite.

BACKGROUND OF THE INVENTION

Oriented strand board (OSB), as described in the Structural Board Association (SBA) bulletin of November 1993, is composed of longitudinally extending strands of hardwood, e.g. aspen, poplar, southern yellow pine, formed by slicing logs in the direction of the grain. After slicing, the strands are dried, blended with wax and a waterproof binder, i.e. adhesive, usually a phenolic resin, and formed into a loose mat of several layers and the mat is hot pressed to bind the wood strands together and form a rigid, dense panel suitable for structural use. A typical commercial OSB structural panel comprises a core of cross-aligned layers bonded to and covered on both sides by face layers in longitudinal alignment. This configuration enhances the strength and stiffness properties of the panel. Such OSB structural elements are increasingly in demand as noted in Panel World, November 1993, pages 9–12, and it is further noted therein that the production of fire retardant OSB has not yet been perfected.

The fire retardant OSB structural element of the present invention is a hot pressed oriented strand board panel which comprises a core of adhesive coated oriented strands of wood bonded together, the core being joined in the course of hot pressing to a pair of covering outer layers of adhesive coated oriented layers of adhesive coated oriented strands of wood. Each said covering outer layer has incorporated therein from 1 to 10% by weight of particles of expandable graphite, and the core being free of expandable graphite, with the volume of the core being from 40% to 60% of the volume of the structural element so that upon exposure of the structural element to external flame, the expandable graphite particles in the outer covering layers will undergo intumescence and increase in volume and establish adjacent to the core a covering adherent layer of vermiform expanded graphite which forms a flame barrier for the underlying core layer.

DETAILED DESCRIPTION OF THE INVENTION

Figure 1:
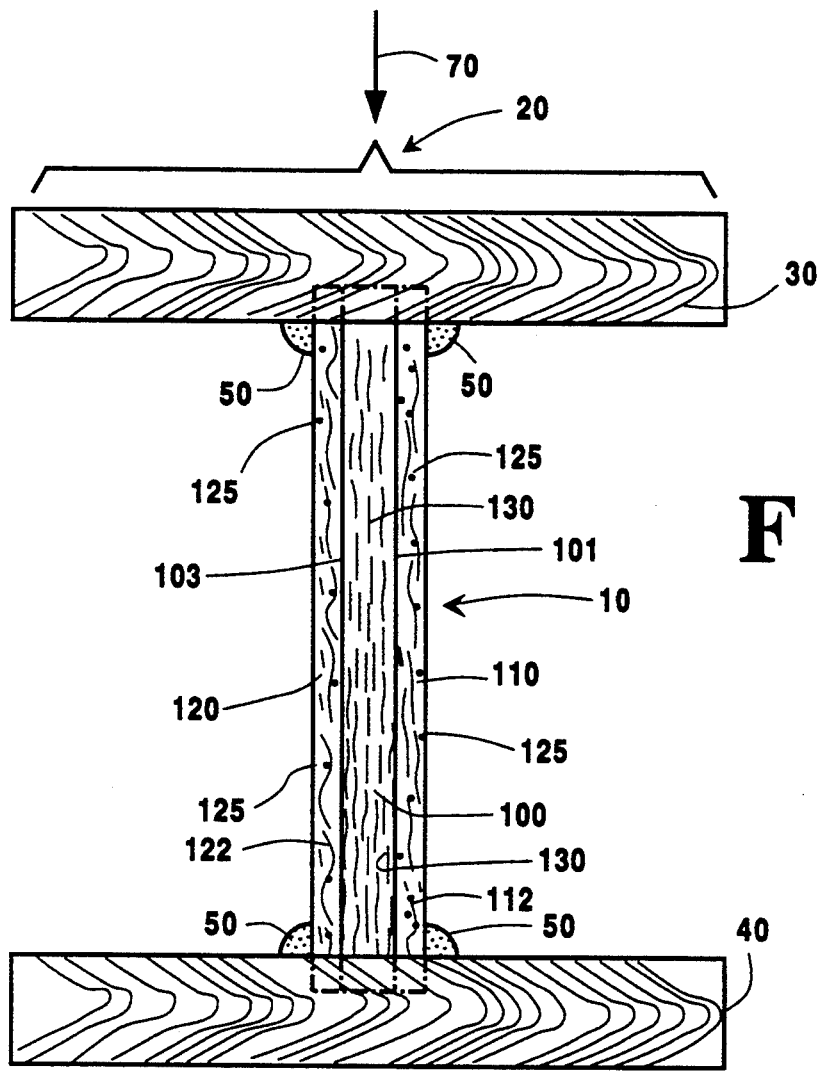
FIG. 1 shows an elevation view of a wooden joist which includes a fire retardant structural element of the present invention.

Graphite is a crystalline form of carbon comprising atoms bonded in flat layered planes with weaker bonds between the planes. By treating particles of graphite, such as natural graphite flake, with an intercalant of e.g., a solution of sulfuric and nitric acid, the crystal structure of the graphite reacts to form a compound of graphite and the intercalant. The treated intercalated particles of graphite are known as particles of "heat expandable graphite" and are commercially available. Upon exposure to high temperature, the particles of intercalated graphite undergo intumescence and expand in dimension as much as 80 or more times its original volume in an accordion-like fashion in the c-direction, i.e. in the direction perpendicular to the crystalline planes of the graphite. The exfoliated, i.e. expanded graphite particles are vermiform in appearance, and are therefore commonly referred to as worms.

A common method for making expandable graphite particles is described by Shane et al in U.S. Pat. No. 3,404,061 the disclosure of which is incorporated herein by reference. In the typical practice of this method, natural graphite flakes are intercalated by dispersing the flakes in a solution containing an oxidizing agent e.g., a mixture of nitric and sulfuric acid. The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid.

A preferred intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solutions may contain metal halides such as ferric chloride, and ferric chloride mixed with sulfuric acid, or a halide, such as bromine as a solution of bromine and sulfuric acid or bromine in an organic solvent.

After the flakes are intercalated excess solution is drained from the flakes and after washing with water, the intercalated graphite flakes are dried and are expandable upon exposure to a flame for only a few seconds. A preferred commercially available expandable graphite flake product is TG-317 available from UCAR Carbon Company Inc. This material has a relatively low "onset" intumescent temperature of 240° C. which means that it will commence exfoliation after only a few seconds exposure to a temperature of 240° C.

Expansion of expandable graphite is known to have properties which decrease thermal conductivity and provide flame retardation (U.S. Pat. No. 5,176,863 and U.S. Pat. No. 3,574,644).

Figure 1A:
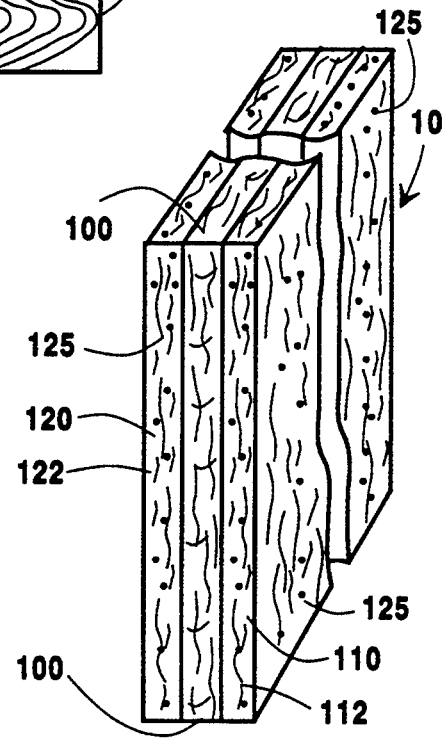
FIG. 1A is a perspective view of the web of the joist of FIG. 1.
Figure 2:
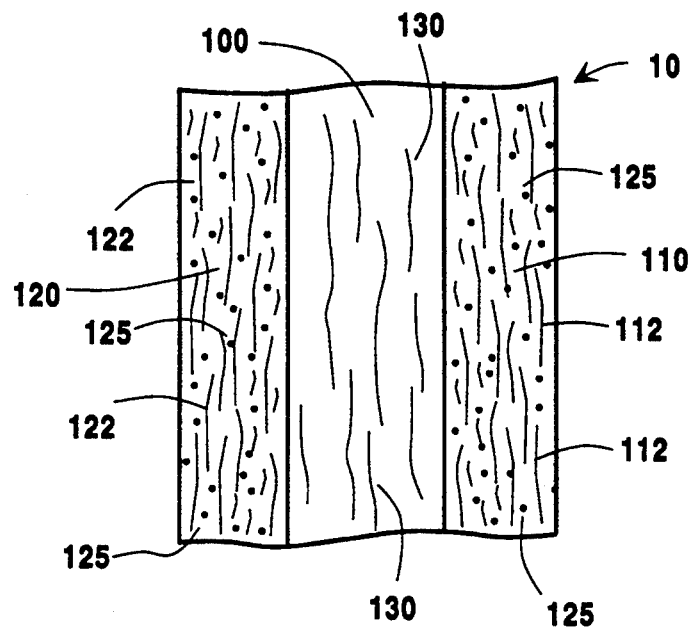
FIG. 2 shows an enlarged view of a portion of the structural fire retardant element of FIG. 1.

In a particular embodiment of the practice of the present invention, with reference to FIG. 1, 1(A) and FIG. 2, a wooden OSB structural element 10 forms the web of wooden truss 20 which also includes flanges 30, 40, suitably made of lumber e.g. or OSB which are bonded to web 10 at fillets 50 suitably formed of phenolic resin. When in use, a force 70 is typically applied to a flange 30 which is supported by web 10 with underlying flange 40. It can be seen that the stiffness and strength properties of web 10 are critical and maintenance of substantial integrity of web 10 is essential.

In the present invention, the web 10 is in the form of a wooden OSB panel formed by well known commercial techniques with a core 100 of oriented wood strands indicated at 130 and outer covering layers 110, 120 also formed from oriented wood strands indicated at 112, 122 which are bonded to the flat, opposed parallel sides 101, 103 of core 100. The core 100 is typically formed from cross-aligned strands as shown in FIG. 1(A), with the strands of outer layers 110, 120 being in longitudinal alignment in accordance with techniques known to the art. A batch of strands of wood to be used for outer layers 110, 120 are conventionally mixed with wax (about 1% by weight), a liquid phenolic resin in amounts of from about 2 to 8% by weight to coat the strands of wood, and, in accordance with the present invention, from about 1 to 20%, preferably 8 to 10% by weight, of expandable graphite particles 125 (suitably sized 50 to 100 mesh) is added to and incorporated into the batch of resin coated strands of wood. A portion of the resulting tacky mass is used to form a first mat of oriented strands of wood which will ultimately form an outer layer of the OSB panel. A further batch of strands of wood to be used for core 100 are conventionally mixed with wax (about 1% by weight) and preferably isocyanate resin (about 1 to 3% by weight) to coat the strands of wood; no particles of expandable graphite are included in this batch of resin coated strands. A portion of this batch, free of expandable graphite, is placed over the first mat to form a second mat of oriented strands of wood which will ultimately form the core of the OSB panel. An additional portion of the batch containing expandable graphite particles is placed over the core mat to form a third mat of oriented strands of wood which ultimately becomes an outer layer of the OSB panel. The respective thicknesses of the above-described adjacent and coextensive first, second and third mats is such that the thickness of the core mat is from 40 to 60% of the total thickness with the outer layer mats being substantially the same and in the range of 20 to 30% of the total thickness. The three layered mat is hot pressed to form a rigid, dense structural element in panel form in which core and outer layer thicknesses are in the same relation as noted above. The temperature of hot pressing is no higher than 218° C., suitably 195° C. at pressures of 200–500 psi to avoid accidental intumescence of expandable graphite particles.

Figure 3:
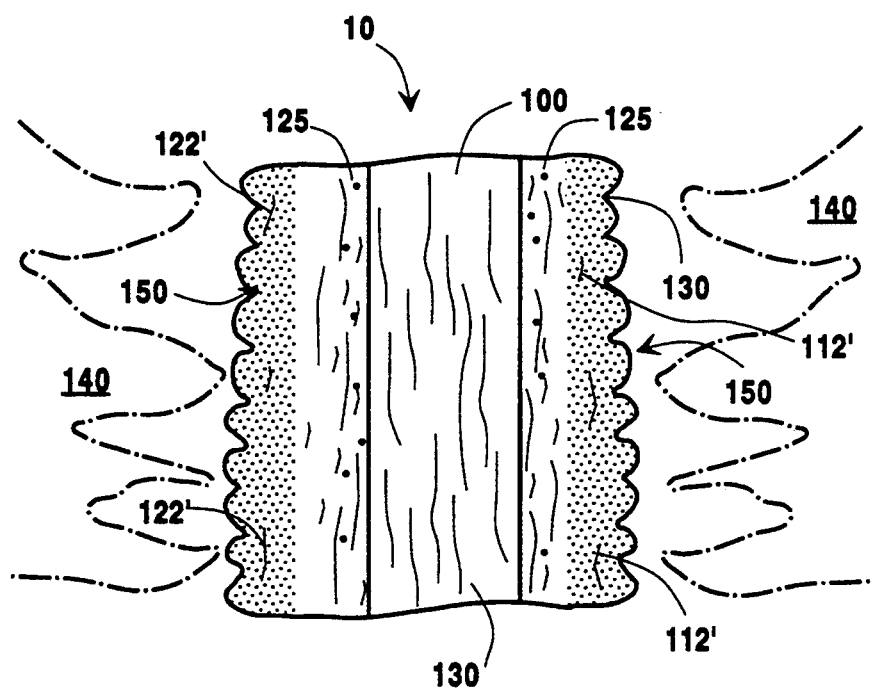
FIG. 3 shows the portion of FIG. 2 after exposure to flame.

In use, the thus formed panel is cut to the desired size to form a web 10 for a wooden truss 20 as shown in FIG. 1, or other desired shape. In the event of exposure of the panel of web 10 to external flame 140, the expandable graphite particles in the outermost portion of layers 110, 120 rapidly intumescence and expand to about 80 or more times in volume and form a covering layer 150 of veriform (worms) of expanded graphite for core 100, which also may cover the innermost portion of layer 110 as shown in FIG. 3 which acts as a flame barrier. The layer 150 of expanded graphite is strongly adherent. The innermost portion of layer 110 is undeformed and still contains some unexpanded particles 125 since the expanded graphite layer 150 cooled this portion of layer 110. Layer 150 of expanded graphite thus covers the core 100 even though some of the wood strands 112', 122' of the outer layers 110, 120 have been largely burned or reduced to char.

In the present invention phenolic resin is used with the outer layer strands since it serves to provide a good bond between the strands of wood and particles of expandable graphite. Isocyanate resin, which is more readily curable, is used in the core batch where graphite is not present. However, the core batch can also employ a phenolic resin, i.e. the bonding system can be all phenolic.

The following Example will illustrate the present invention:

EXAMPLE

Test batches for the outer layers of OSB panel were prepared by blending the following to form panels of the type shown in FIGS. 1(A) and 2:

3, 5, 7.5, and 10% by Weight Expandable Graphite Particles (flake sized 60 mesh)—UCAR Carbon Company Inc.

4–7% by Weight Liquid Phenolic Resin

1% by Weight Wax 0.03–0.09% by Weight MgO

Bal. Aspen Strands (moisture content=7%)

An additional, graphite-free batch for the core of OSB panel, and for use in a graphite-free control panel, was prepared by blending the following:

96.8% by Weight Aspen Strands (moisture content=7%)

2.2% by Weight Isocyanate Resin

1% by Weight Wax

The batches were used to provide three layer mats hot pressed into 7/16 in. thick OSB panel with the core thickness being 50% of the total thickness and the two outer layers each being 25% of the total thickness. The hot pressing conditions were 350 psi for 5 minutes at 195° C. The resulting panel had a density of 39 pounds per cubic foot.

Specimens (sized 3⅞ inches by 23⅞ inches by 7/16 inch thick) of the three layer OSB panel and a similarly sized control panel were tested for flame spread in accordance with ASTMD3806-90a in a two foot long tunnel with the following results:

| Material | Flame Spread Index (FSI) |
| --- | --- |
| Standard OSB (No Expandable Graphite)-Control | 94 |
| 3% Expandable Graphite in Outer Layer | 65 |
| 5% Expandable Graphite in Outer Layer | 54 |
| 7.5% Expandable Graphite in Outer Layer | 46 |
| 10% Expandable Graphite in Outer Layer | 31 |

Class A (Best): 0–25
Class B: 26–75
Class C: >75

The cores of the graphite containing test specimens were unaffected by the test and these specimens were covered by a layer of vermiform expanded graphite as indicated in FIG. 3 at 150 and were in the Class B category. The mechanical properties of the best specimens of this invention were essentially unaffected. The control specimen, which contained no expandable graphite was Class C, i.e. non-approved for flame retardant applications.

What is claimed:

1. Oriented strand board panel formed by hot pressing a mat of resin coated wood strands in which expandable graphite particles are incorporated, said panel comprising a core of resin bonded wood strands with opposite sides and a covering layer of resin bonded wood strands on each side of said core, each said covering layer containing from about 1 to 20% by weight of expandable graphite particles dispersed therein and said core being free of expandable graphite.

2. Panel in accordance with claim 1 wherein each said covering layer contains about 8 to 10% by weight of expandable graphite.

3. Panel in accordance with claim 1 wherein said core which is free of expandable graphite has a thickness which is 40 to 60% of the thickness of the panel.

4. Panel in accordance with claim 3 wherein each covering layer has about the same thickness.

* * * * *